US006012002A

United States Patent [19]

Tapping et al.

[11] Patent Number: 6,012,002

[45] Date of Patent: Jan. 4, 2000

[54] VEHICLE TRAVEL METER

[75] Inventors: Trevor Edwin Tapping, Northamptonshire; Alan George Rock, Oxfordshire, both of United Kingdom

[73] Assignee: Stack Limited, Oxfordshire, United Kingdom

[21] Appl. No.: 08/809,871

[22] PCT Filed: Sep. 29, 1995

[86] PCT No.: PCT/GB95/02317

§ 371 Date: Jun. 4, 1997

§ 102(e) Date: Jun. 4, 1997

[87] PCT Pub. No.: WO96/10806

PCT Pub. Date: Apr. 11, 1996

[30] Foreign Application Priority Data

Oct. 3, 1994 [GB] United Kingdom .................. 9419860

[51] Int. Cl.[7] .......................... G01M 15/00; G07C 1/24; G04F 8/08

[52] U.S. Cl. ......................... 701/25; 73/117.3; 73/118.1; 701/35; 701/65; 701/70

[58] Field of Search .................................. 73/116, 117.2, 73/117.3, 118.1; 701/1, 24, 25, 65, 70, 35

[56] References Cited

U.S. PATENT DOCUMENTS

| | | | |
|---|---|---|---|
| 4,694,687 | 9/1987 | Bonin et al. | 73/116 |
| 4,857,886 | 8/1989 | Crews | 340/323 R |
| 5,138,589 | 8/1992 | Kimbel | 368/6 |
| 5,475,597 | 12/1995 | Buck | 701/35 |
| 5,758,299 | 5/1998 | Sandborg et al. | 701/35 |

FOREIGN PATENT DOCUMENTS

| | | |
|---|---|---|
| 8290603 | 5/1984 | Australia . |
| 1243753 | 10/1988 | Canada . |
| 220115 | 4/1987 | European Pat. Off. . |
| 8912279 | 12/1989 | WIPO . |
| 9203768 | 3/1992 | WIPO . |

OTHER PUBLICATIONS

Electronic Design, vol. 23, No. 12, Jun. 7, 1975, Hesbrouck, pp. 34, 36.

*Primary Examiner*—George Dombroske

*Attorney, Agent, or Firm*—Stevens, Davis, Miller & Mosher, L.L.P.

[57] ABSTRACT

Provided is a vehicle travel meter comprising a first sensor for monitoring a first variable of travel of a vehicle over a route, a second sensor for monitoring a second variable of travel of the vehicle over the route; memory means arranged to store a plurality of sets of travel data corresponding to a plurality of locations on the route, each set consisting of a value of the first variable and a value of the second variable of travel; selecting means for selecting a set of travel data stored in the memory means in which the value of the first variable is substantially identical to a value of the first variable measured by the first sensor; performance determining means for determining a difference between the value of the second variable of the selected set of travel data and a value of the second variable measured by the second sensor, and display means for displaying in real time the difference determined by the performance determining means to a driver of the vehicle.

12 Claims, 1 Drawing Sheet

VEHICLE TRAVEL METER

Figure 1:
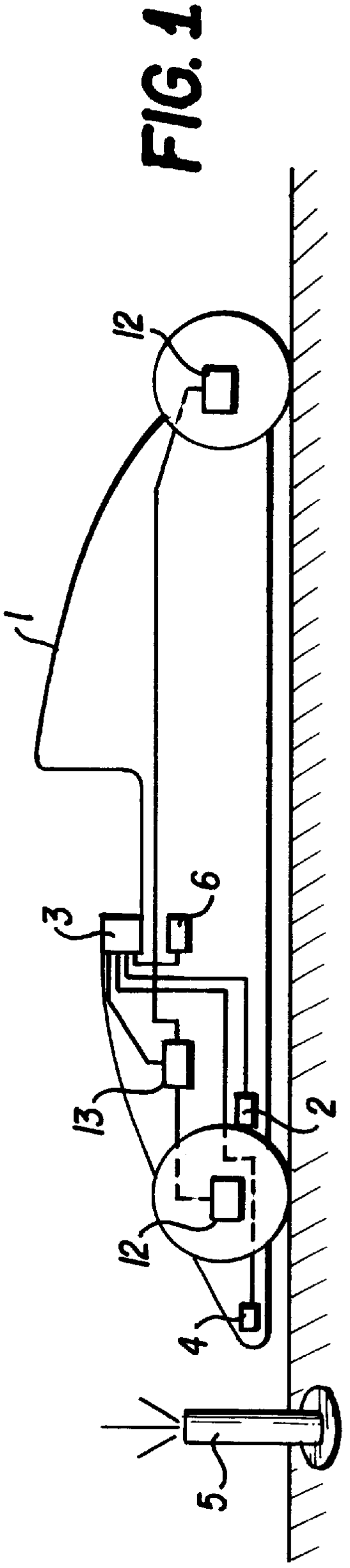

The present invention relates to a vehicle travel meter for use with vehicles when driven repeatedly along the same route to provide information on the performance of the vehicle with respect to different locations on the route and a method thereof. The vehicle travel meter is of particular use in racing and vehicle testing.

In recent years data-logging systems have been developed specifically for use in car racing and production car design which monitor a selection of variables of a car's performance for example speed, engine temperature and oil pressure etc. The data is stored in a memory for future analysis and may also be supplied to the driver of the vehicle on a display, usually mounted on the dashboard of the car.

It has been realised that often the most significant information for the driver of a car is not such measurements of variables of the car's performance, but whether the driver has managed to drive the car any faster. Conventionally, the driver is supplied with such information on a lap by lap basis since the end of a lap and hence the start of the next is an easily identifiable location on the route. Thus, traditionally the driver has had no instantaneous sub-lap information on how the car is performing, for example at specific places on the circuit, i.e. at particular bends.

The present invention seeks to provide a vehicle travel meter which supplies information on how the vehicle is performing at a plurality of locations along a route and whether the vehicle is performing better or worse than on past journeys over the same route.

In a first aspect the present invention provides a vehicle travel meter comprising a first sensor for monitoring a first variable of travel of a vehicle over a route, a second sensor for monitoring a second variable of travel of the vehicle over the route; memory means arranged to store a plurality of sets of travel data corresponding to a plurality of locations on the route, each set consisting of a value of the first variable and a value of the second variable of travel; selecting means for selecting a set of travel data stored in the memory means in which the value of the first variable is substantially identical to a value of the first variable measured by the first sensor; performance determining means for determining a difference between the value of the second variable of the selected set of travel data and a value of the second variable measured by the second sensor, and display means for displaying in real time the difference determined by the performance determining means.

In a further aspect the present invention provides a vehicle travel meter comprising at least one performance measuring device for generating data representative of the performance of a vehicle with respect to a plurality of locations on a route travelled by the vehicle, one or more suspension sensors for generating suspension data representative of the plurality of locations on the route and memory means for storing said suspension data and associated performance data for each location on the route.

With the present invention sub-lap information on the performance of a vehicle over selected regions of the route can be supplied to a driver.

It will of course be understood that reference to a route and to a journey taken over a route relates to any substantially repeatable path taken by a vehicle as it is driven. The route may be in the form of a track or circuit but is not limited to such and in addition covers routes over public highways for example, or off-road.

In a preferred embodiment the vehicle travel meter includes a display which can provide real-time sub-lap performance data for each of the locations on the route. Also, difference means for determining the difference between performance data associated with a location on the route from a previous journey of the vehicle over the route and performance data associated with the same location on the route from a subsequent journey of the vehicle over the route. The determined difference data may be stored in the memory means and/or displayed on the display to the driver.

Figure 2:
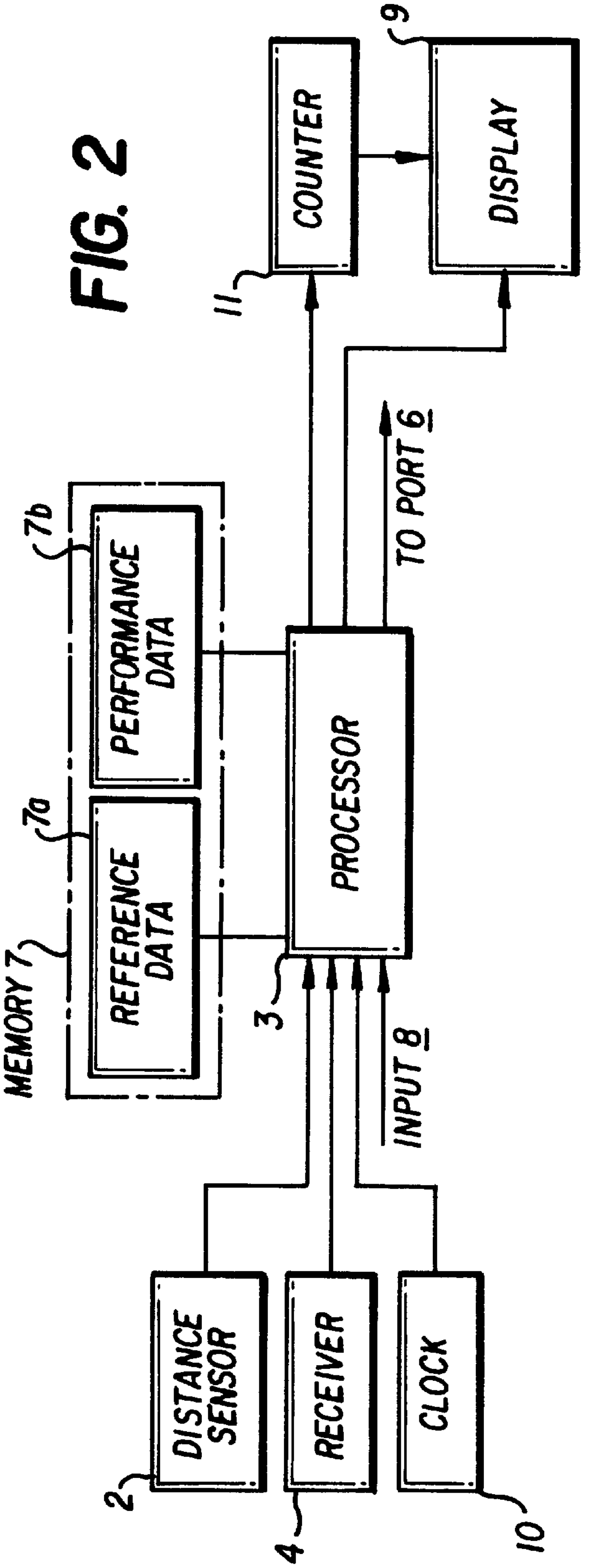

Embodiments of the present invention will now be described by way of example with reference to the accompanying drawings, in which:

FIG. 1 shows schematically a car with a vehicle travel meter in accordance with the present invention; and FIG. 2 is a schematic diagram of a first embodiment of the vehicle travel meter of FIG. 1.

A vehicle, in this case a car 1, is shown in FIG. 1 with a distance sensor 2 mounted adjacent a wheel mounting of the car 1. The sensor 2 is used to provide travel data and detects the rotation of the wheel of the car 1 so as to generate a pulse for a predetermined number of rotations of the wheel. The sensor 2 may be mounted either on or adjacent the wheel mounting and is connected to and supplies the pulses generated to a processor 3 which is provided on the dashboard of the car 1. The processor 3 will be described in greater detail later with reference to FIG. 2.

A receiver 4 is also provided on the car 1. The receiver 4 is connected to the processor 3 and outputs a signal to the processor 3 each time a predetermined transmission is picked up by the receiver 4. The receiver 4 is conventional in design and is used to receive signals from a beacon 5 located adjacent the track around which the car is driven.

A port 6 is shown in FIG. 1 connected to the processor 3 and is used to extract data stored by the processor 3 for future analysis.

Turning now to FIG. 2, as mentioned above, the processor 3 is connected to the sensor 2 and the receiver 4. The processor 3 is also connected to a memory 7. The memory 7 has two portions, a first portion 7*a* in which reference data is stored and a second portion 7*b* in which performance data may be stored. The reference data stored in the first portion 7*a* of the memory may be predetermined and supplied through an input 8 to the processor 3. Alternatively, the reference data may be obtained in a test lap of the track and stored in the memory for use in determining the location of the vehicle on the track and for determining the performance of the vehicle at different locations on subsequent laps of the track.

A display 9 is connected to the processor 3 and is used to display continuously real time data supplied by the processor 3 on the distance travelled by the car 1 around the track and the time taken. The time taken is determined by the processor 3 by means of a clock 10. A counter 11 which is connected to the processor 3, keeps a record of the number of laps done by the car 1. The counter 11 may also be connected to the display 9 so that the number of laps may be displayed to the driver.

When in use, as the car is driven around the track, the sensor 2 generates pulses which are input into the processor 3. The processor 3 is programmed to calculate the distance travelled by the car on the basis of the number of pulses received from the sensor 2 which are counted by a counter (not shown) and the size of the wheels of the car, which is known. The processor 3 receives the pulses from the sensor 2 and manipulates the raw data received so as to enable the calculated distance travelled to be continuously supplied to the display 9 so that the driver has a substantially instantaneous real time indication of the distance travelled.

When the car 1 passes the beacon 5, the receiver 4 picks up the transmission from the beacon 5 and outputs a signal to the processor 3. The signal from the receiver 4 is taken as an indication of the end of a lap and the start of the next.

On receipt of a signal from the receiver 4, the processor 3 resets its record of the number of pulses received from the sensor 2 and thereby its calculation of the distance travelled by the car to zero. As the processor 3 resets to zero a pulse is output to the counter 11 which is incremented by one and is thereby a record of the number of laps completed by the car 1.

At the same time as the distance travelled is being calculated by the processor 3, the time elapsed is also output from the clock 10 into the processor 3 and is displayed on the display 9. When a signal is received from the receiver 4 indicating the end of a lap, the time elapsed is also reset to zero. In this way the driver is supplied with substantially instantaneous or real time information on how far the vehicle has travelled around the lap and how quickly that distance was travelled.

As mentioned earlier, reference data is stored in the memory 7 and is in the form of sets of data on the times taken for the car to travel different distances around the track and may be stored vice versa. This data is addressed by the processor 3 at the same time as the actual distances travelled and times elapsed are being determined. The processor 3 includes a selecting device and a difference comparator. The selecting device selects a set of data in the memory 7*a* which has a stored distance travelled, which is representative of a location on the circuit, identical to the sensed distance travelled. The selecting device may include a null comparator which generates an output when no difference is identified between the stored travel data and the sensed travel data. The difference comparator then compares the actual time elapsed with a reference elapsed time for the actual distance travelled and determines whether the actual elapsed time is greater or less than the reference elapsed time for the same distance and how much greater or less. The difference in elapsed time is then output to the display 9. In this way the driver is provided with a continuous display giving real time information on whether the car has gone faster or slower than the reference time to reach a particular location on the track or circuit.

Alternatively, the processor 3 may be adapted to compare the actual distance travelled with a reference distance for the actual time elapsed. A difference between the actual distance travelled and the reference distance is determined and output to the display 9 so that the driver is provided with a continuous and substantially instantaneous display indicating whether the car has gone further around the track than the reference distance for the actual elapsed time.

Thus, with the vehicle travel meter a real time continuous display is provided of the distance travelled by the car and the time taken to travel that distance, along with an indication of whether those measurements are faster or slower or alternatively further or not as far as the reference data for the track.

As mentioned earlier, the first portion 7*a* of the memory holds reference travel data which is used in the different calculations performed by the processor 3. This reference data may be initially stored by inputting the reference data through the input port 8 of the processor 3. Alternatively, the reference data can be obtained from a reference lap driven around the circuit. The second portion 7*b* of the memory is used to store the performance data which is displayed in real time on the display 9 for the current lap. Thus, at the same time as the travel data is output to the display 9, the same travel data is also output to the second portion 7*b* of the memory. This stored data is over written as data for each new lap is generated.

Hence, when a reference lap is being driven, the vehicle travel meter operates in its usual manner and the distance and time data displayed is stored in the second portion 7*b* of the memory. If, at the end of that lap, the driver decides to use the lap as a reference lap, he can instruct the processor 3 to transfer the data in the second portion 7*b* of the memory to the first portion 7*a*. This may be done by means of a switching device on either the processor 3 or display 9.

At the end of a lap, the lap data appearing on the display 9 may be held constant for a short while to enable a driver to check the overall lap performance. The display 9 then returns to it usual continuously updated display of the sub-lap performance data. At the end of a run, when the car returns to the pits, the data held in the memory 7 may be down loaded into a PC for subsequent analysis.

The sensor 2 may be replaced with a gyroscope or accelerometer which generates signals that are proportional to the rate of change of position of the car. This information may then be used by the processor 3 to calculate the distance travelled by the car.

Also, it will of course be understood that the display 9 may be analogue or digital. In the case of an analogue display the calculated distance or time differences may be represented graphically or with a pointer and indicating in either case whether the difference is greater or less than the reference. In the case of a digital display, a simple numerical display may be used again with an indication of whether the difference is positive or negative. The display 9 may be integral with the processor 3 or separate. Also, the display 9 and processor 3 need not be mounted on the dashboard of the car. All that is required is for the display 9 to be visible to the driver of the car. The processor 3 may be located anywhere on the car that is convenient. This is also true of the receiver 4 which need not be located in the nose of the car, as shown in the drawings.

The beacon 5 and receiver 4 are conventional in design. The beacon 5 may either generate a directional signal in which case as the receiver 4 passes the beacon, the signal from the beacon is received indicating the end of a lap and start of the next. Alternatively, the beacon 5 may be one of a set of beacons arranged around the circuit which generate non-directional signals. The receiver 4 may then pick up the different signals from the set of beacons and identify the precise location of the car on the circuit on the basis of the intersection of the signals received from the different beacons with respect to a map of the circuit stored in a memory.

The vehicle travel meter may provide detailed information on the instantaneous location of the car on a circuit which may be used to synchronise sub-lap data on the carts performance between laps. This may be done by flagging the car performance data with data on the instantaneous location of the car on the circuit when the performance data is generated. Performance data for the same location on subsequent laps can then be identified and correlated. This enables the data to be reviewed after the car has finished the laps. In which case, if post-analysis only is required, the display 9 may be dispensed with.

The vehicle travel meter may also have one or more sensors 12 mounted on the suspension of the vehicle to monitor the response of the suspension to the movement of the vehicle as it is being driven. Individual features of the circuit can be identified from the suspension data since in different laps the driver usually follows a substantially identical route around the circuit. Thus, suspension data from a current lap can be correlated with similar data from a former lap as representing the same point on the circuit by selecting substantially identical suspension data. It has been found that the use of suspension data is a highly accurate method of correlating performance data from different laps.

The vehicle travel meter also includes an analyser 13 which receives the suspension data from the sensors 12 and compares the data with suspension data for a previous lap stored in a memory to generate a correlation coefficient. Where the coefficient tends to a minimum the suspension data is deemed to relate to substantially identical points on the circuit. This may then be input into a processor 3 for use in generating the real time sub-lap performance data. Correlation of suspension data may also be used to correlate data channels in the memory to enable subsequent analysis of the performance data for different laps to be compared accurately.

The suspension data generated can be used either alone to represent the location of the vehicle on a circuit or in combination with other data such as the travel data from the distance sensor 2. In the latter case, the suspension data generated can be used in the manipulation of the travel data by the processor 3 to enable the distance travelled to be calculated and a difference with respect to reference data determined in real-time.

It will of course be appreciated that continuous suspension data for every point of a lap is not always necessary and instead short sequences of suspension data corresponding to distinguishable features of the circuit, e.g. bends, may be utilised. This system has the particular advantage that even if the driver departs from the usual line taken around the track, e.g. in overtaking, the suspension data can be used to realign or resynchronise travel data and performance data by correlation with suspension data from a former lap once the driver has returned to the usual line taken on the circuit.

Where suspension data is used, the vehicle travel meter may also be used to monitor wheel slip, i.e. in a spin or a wheel lock, and brake and turn point compression. Moreover, the use of suspension data means that in certain cases the receiver 4 and beacon 5 may be omitted since the suspension data can be used to identify the end of a lap.

Also, there may be provided in addition to the display a device for generating a variable audible signal to indicate the performance of the vehicle. For example, the device may be arranged to generate an audible signal the frequency of which varies with respect to the vehicle's performance. The frequency may increase with increasing performance and decrease with a reduction in performance calculated on the basis of the difference between stored travel data and measured travel data.

Further adaptions and alterations of the vehicle travel meter are envisaged without departing from the spirit and scope of the invention.

We claim:

1. A vehicle travel meter comprising a first sensor for monitoring a first variable of travel of a vehicle over a route, a second sensor for monitoring a second variable of travel of the vehicle over the route; memory means arranged to store a plurality of sets of travel data corresponding to a plurality of locations on the route, each set consisting of a value of the first variable and a value of the second variable of travel; selecting means for selecting a set of travel data stored in the memory means in which the value of the first variable is substantially identical to a value of the first variable measured by the first sensor; performance determining means for determining a difference between the value of the second variable of the selected set of travel data and a value of the second variable measured by the second sensor, and display means for displaying in real time the difference determined by the performance determining means to a driver of the vehicle.

2. A vehicle travel meter as claimed in claim 1, wherein the performance determining means includes a comparator for calculating the difference between the value of the second variable in the selected set and a value of the second variable measured by the second sensor.

3. A vehicle travel meter as claimed in claim 1, wherein one of the first and second sensors is a distance sensor for determining the distance travelled by the vehicle and the other of the first and second sensors is clock means for determining the elapse of time of the journey of the vehicle.

4. A vehicle travel meter as claimed in claim 1, wherein there is further provided one or more suspension sensors for measuring the response of the suspension of the vehicle.

5. A vehicle travel meter as claimed in claim 1, wherein the selecting means, performance determining means and display means are adapted to operate continuously.

6. A vehicle travel meter comprising at least one performance measuring device for generating data representative of the performance of a vehicle with respect to a plurality of locations on a route travelled by the vehicle, one or more suspension sensors for generating suspension data representative of the plurality of locations on the route and memory means for storing said suspension data and associated performance data for each location on the route.

7. A vehicle travel meter as claimed in claim 6, wherein a suspension sensor is provided for each wheel suspension of the vehicle.

8. A vehicle travel meter as claimed in claim 6, wherein said performance measuring device is a clock for determining the time taken to reach each location on the route.

9. A vehicle travel meter as claimed in claim 6, wherein there is further provided a display for displaying at least performance data to the driver of the vehicle.

10. A vehicle travel meter as claimed in claim 6, wherein there is further provided difference means for determining the difference between performance data associated with a location on the route from a previous journey of the vehicle over the route and performance data associated with the same location on the route from a subsequent journey of the vehicle over the route.

11. A vehicle travel meter as claim 9, wherein the display is arranged to display said determined difference.

12. A vehicle travel meter as claimed in claim 11, wherein said display is arranged to display real-time performance data and difference data.

* * * * *